Figure 1:
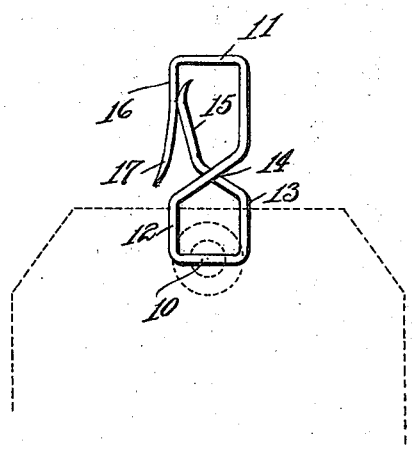

Sept. 30, 1924.  E. J. BRACKEN  1,510,380

TAG FASTENING MEANS

Filed Aug. 28, 1923

Inventor
Earl J. Bracken

By Horace Chandler
Attorney

Patented Sept. 30, 1924.

1,510,380

UNITED STATES PATENT OFFICE.

EARL J. BRACKEN, OF BUTTE, MONTANA.

TAG-FASTENING MEANS.

Application filed August 28, 1923. Serial No. 659,825.

*To all whom it may concern:*

Be it known that I, EARL J. BRACKEN, a citizen of the United States, residing at Butte, in the county of Silverbow, State of Montana, have invented certain new and useful Improvements in Tag-Fastening Means; and I do hereby declare the following to be a full, clear, and exact description of the invention, such as will enable others skilled in the art to which it appertains to make and use the same.

This invention relates to tag fastening means and more particularly to devices of this kind arranged for fastening shipping tags and the like directly to the burlap or cloth coverings of sacks or bales.

The primary object of this invention is to provide a thoroughly practical and efficient fastening means, so that all danger of the tag becoming disengaged from the fastening means or the said fastening means becoming disengaged from the bale or sack is obviated.

Another object of the invention is to provide a tag fastener wherein the tag, at all times, will be held out of contact with the fastening means, with the result that the device can be more readily attached to a bale or the like and so that the tag will always hang in a free position.

Still another object is to provide such a device which is extremely simple in construction so that it may be manufactured in large quantities at a relatively small cost.

Other objects and advantages will become more apparent from the following description when taken in connection with the accompanying drawings.

In the drawings:

Figures 1, 2, 3 and 4 are views, in elevation, of four different forms of the present invention.

Figure 2:
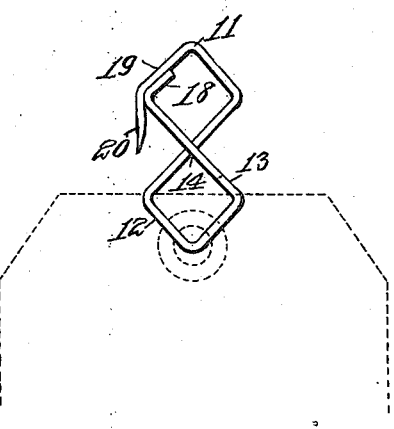
Figure 3:
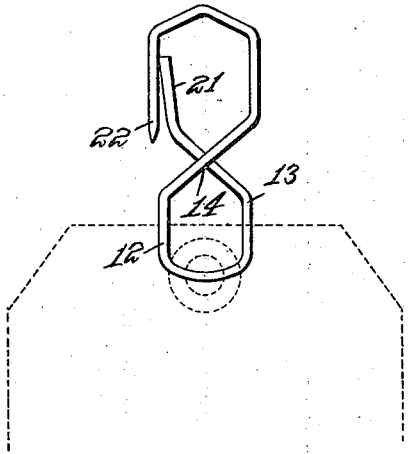

Reference being had to the accompanying drawings, it will be seen that each form of the invention is preferably formed from a single length of wire and that in each of the forms shown in Figures 1, 2 and 3, the wire is formed to provide a tag retaining loop 10 and a fastening loop 11, the wire being further bent to form the converging arms 12 and 13, which are diagonally crossed as at 14. At the crossing point 14, the said arms 12 and 13 bear against each other so that once a shipping tag is inserted within the loop 10, there is no danger of it becoming disengaged therefrom.

By referring more particularly to the form of the invention shown in Figure 1, the arm 13 extends only slightly beyond the crossing point 14 and is then deflected upwardly and outwardly, to form the tongue 15, the extremity of which bears against the downwardly projecting arm 16 of the fastening loop 11. Approximately intermediate the crossing point 14 and the end of the tongue 15, the arm 16 is curved slightly outwardly to form a hook 17, which is adapted for insertion within a bale or sack, and the extremity of the hook is therefore preferably pointed to facilitate this operation.

In the form shown in Figure 2, the arm 13 extends diagonally a greater distance beyond the crossing point 14 than in the first form and is then bent upwardly and inwardly to form the tongue 18. The downwardly projecting arm 19 of the fastening loop 11 extends substantially parallel to the tongue 18 and bears thereagainst, the lower end portion of the arm 19 being bent to form the substantially vertical downwardly projecting hook 20, for insertion in a bale or the like, the said hook being terminally pointed.

In the form shown in Figure 3, the arm 13 also extends somewhat beyond the crossing point 14, before it is bent to form the upwardly and outwardly extending tongue 21, the extremity of which bears against the downwardly projecting arm 22, which arm is substantially vertical and projects below the tongue 21.

Figure 4:
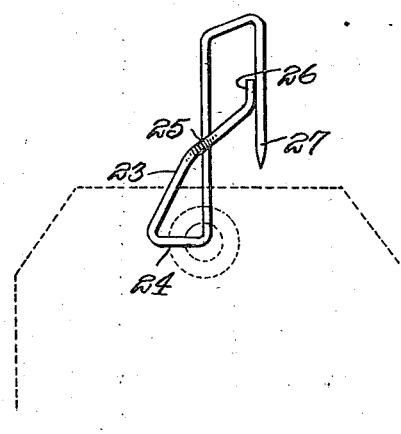

The form shown in Figure 4 is somewhat different from the three forms previously described. This form includes an arm 23, having its lower end portion bent outwardly and then upwardly and inwardly to form the tag retaining loop 24. This end portion crosses the arm as at 25 and after extending slightly therebeyond, it is bent upwardly to form a tongue 26, which bears against the downwardly projecting arm 27 which is a continuation of the upper end portion of the arm 23. This arm 27 extends downwardly beyond the tongue 26 and is terminally pointed to facilitate its insertion within a bale or the like.

In the application of the fastening means, and after a tag has been inserted within the retaining loop 10 by forcing it down over the tongue and beyond the crossing point 14, the hook is inserted within the covering of a bale or the like and after it has been moved a sufficient distance, it is pushed out of the bale, with the result that a portion of the covering is gripped in a manner somewhat similar to that of a safety pin. The device is then twisted until that portion of the gripped covering passes beyond the tongue into the fastening loop 11.

From the above description, it will be seen that there have been provided four different ways in which the purposes of this invention might be carried into operation, all of which forms are thoroughly capable of performing all of the functions and accomplishing all of the objects claimed.

What is claimed is:

1. A tag fastener including a fastening loop and a tag retaining loop, with a barrier between said loops, an upwardly extending tongue carried by the tag retaining loop, and a downwardly projecting arm carried by the said fastening loop and contacting with said tongue, the said arm projecting below the said tongue to form a hook.

2. A tag fastener including a fastening loop and a tag retaining loop, a tongue carried by the tag retaining loop, an arm carried by the fastening loop and contacting with the tongue, the said arm projecting beyond the tongue to form a hook.

3. A tag fastener including a fastening loop and a tag retaining loop, an arm carried by the fastening loop, a tongue carried by the tag retaining loop, the terminal of said tongue being positioned within the fastening loop and contacting with the arm, and a hook carried by the arm.

4. A tag fastener including a fastening loop and a tag retaining loop, with a barrier between said loops, a downwardly projecting arm carried by the fastening loop, and an upwardly extending tongue carried by the tag retaining loop, the said tongue being positioned within the fastening loop and contacting with said arm, which arm projects beyond the said tongue to form a hook.

5. A tag fastener including a fastening loop and a tag retaining loop, an arm carried by the fastening loop, a tongue carried by the tag retaining loop, said tongue being positioned in the same plane as the arm and contacting therewith, the said arm extending past the terminal of the tongue to form a hook.

In testimony whereof, I affix my signature, in the presence of two witnesses.

EARL J. BRACKEN.

Witnesses:
 THOS. M. MULVANEY,
 GERTRUDE LESLIE.